US011866891B2

(12) United States Patent
Johnson

(10) Patent No.: US 11,866,891 B2
(45) Date of Patent: Jan. 9, 2024

(54) ADJUSTABLE PITCH ROTOR FOR MILLING APPLICATIONS

(71) Applicant: Caterpillar Paving Products Inc., Brooklyn Park, MN (US)

(72) Inventor: Nicholas B. Johnson, Dayton, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 84 days.

(21) Appl. No.: 17/500,707

(22) Filed: Oct. 13, 2021

(65) Prior Publication Data

US 2023/0112546 A1 Apr. 13, 2023

(51) Int. Cl.
*E01C 23/088* (2006.01)
*E01C 23/12* (2006.01)
*B28D 1/18* (2006.01)

(52) U.S. Cl.
CPC .......... *E01C 23/088* (2013.01); *E01C 23/127* (2013.01); *B28D 1/188* (2013.01)

(58) Field of Classification Search
CPC ............... E01C 23/088; E01C 23/0946; E01C 23/0993; E01C 23/127; B28D 1/18; B28D 1/186; B28D 1/188; E21C 27/24
See application file for complete search history.

(56) References Cited

U.S. PATENT DOCUMENTS 3,647,265 A * 3/1972 Pentith .................... E21D 9/104 175/435
4,720,207 A * 1/1988 Salani ................... E01C 23/088 404/90
5,505,598 A * 4/1996 Murray .................... B28D 1/18 404/90
5,536,073 A * 7/1996 Sulosky .................. E21C 25/10 299/87.1
6,213,560 B1 * 4/2001 Lindblom .............. B28D 1/186 404/90

(Continued)

FOREIGN PATENT DOCUMENTS

CN 104088218 B 3/2016
CN 105525562 B 5/2020

(Continued)

*Primary Examiner* — Abby J Flynn
*Assistant Examiner* — Michael A Goodwin
(74) *Attorney, Agent, or Firm* — Von Briesen & Roper, S.C.

(57) ABSTRACT

An adjustable pitch rotor for a milling machine includes an inner drum and an outer shell formed by first and second outer shell portions. Drum cutting assemblies with cutting bits extend outward from outer surfaces of the outer shell portions, with each of the cutting bits being longitudinally spaced from longitudinally adjacent cutting bits on their respective outer shell portions by a pitch distance. In a first pitch configuration, each cutting bit may be longitudinally aligned with a corresponding cutting bit on the other outer shell portion so that grooves milled in a work surface by the rotor are spaced by the pitch distance. In a second pitch configuration, each of the cutting bits may be longitudinally spaced from longitudinally adjacent cutting bits of the other outer shell portion by one-half the pitch distance to mill grooves in the work surface that are spaced by one-half the pitch distance.

20 Claims, 4 Drawing Sheets

(56) References Cited

U.S. PATENT DOCUMENTS

| | | | | |
|---|---|---|---|---|
| 11,174,604 | B1 * | 11/2021 | Johnson | E01C 23/127 |
| 2004/0145232 | A1 * | 7/2004 | Sansone | B28D 1/188<br>299/39.8 |
| 2016/0186392 | A1 * | 6/2016 | Mahlberg | E01C 23/088<br>299/1.5 |
| 2017/0022674 | A1 * | 1/2017 | Stark | E01C 23/0946 |
| 2018/0328174 | A1 | 11/2018 | Magee et al. | |
| 2022/0030755 | A1 * | 2/2022 | Meier | A01B 33/12 |

FOREIGN PATENT DOCUMENTS

| | | | |
|---|---|---|---|
| EP | 0875625 | A2 * | 11/1998 |
| EP | 1194651 | B2 | 9/2011 |
| EP | 3415690 | B1 | 3/2020 |
| WO | 2018098599 | A1 | 6/2018 |

* cited by examiner

ADJUSTABLE PITCH ROTOR FOR MILLING APPLICATIONS

TECHNICAL FIELD

The present disclosure relates to a cutting rotor associated with a machine and, more particularly, to a rotor having an adjustable pitch for milling applications.

BACKGROUND

Machines, such as cold planers, rotary mixers, and other milling machines, are used for scarifying, removing, mixing, or reclaiming material from surfaces such as, grounds, roadbeds, and the like. Such machines include a rotor enclosed within a rotor chamber. The rotor includes a cylindrical shell member and a number of cutting assemblies mounted on the shell member. When the machine is performing a cutting operation, cutting bits of the cutting assemblies impact the surface and break it apart. Thus, the cutting assemblies are arranged to cut the surface and to leave a milled surface that meets a known texture requirement. Another function of the cutting assemblies is to form an auger that moves material within the rotor chamber to a central area of the rotor chamber from where it can be moved by a conveyor to a truck. U.S. Publ. Appl. No. 2018/0328174 describes a cold planer milling machine having a rotor with a cylindrical shell member with cutting bits extending from an outer surface that impact and cut a surface over which the machine travels.

Departments of transportation around the world have different requirements for finished road texture after the road has been milled. In many instances, the differences are based on whether the road will be opened or closed to traffic prior to repaving the road. In other instances, a very coarse cut profile is all that is required. For a given mill crew, the different job requirements are encountered on a monthly, weekly or even daily basis. To meet the varying job requirements, the mill crews have different rotors on hand that match the various job requirements. The additional rotors constitute additional capital investment that sits idle until needed to meet specific job requirements, and then additional time and labor is required to swap in the required rotor for the rotor currently installed on the machine.

SUMMARY OF THE DISCLOSURE

In one aspect of the present disclosure, a rotor for a milling machine is disclosed. The rotor may include an inner drum having a hollow cylindrical shape and an inner drum outer surface, and an outer shell. The outer shell may include a first outer shell portion with a first set of drum cutting assemblies having first cutting bits extending outward from a first shell portion outer surface, wherein each of the first cutting bits is longitudinally spaced from longitudinally adjacent first cutting bits by a pitch distance, and a second outer shell portion with a second set of drum cutting assemblies having second cutting bits extending outward from a second shell portion outer surface, wherein each of the second cutting bits is longitudinally spaced from longitudinally adjacent second cutting bits by the pitch distance. When the first outer shell portion and the second outer shell portion are mounted to the inner drum outer surface in a first pitch configuration, each of the first cutting bits may be longitudinally aligned with a corresponding one of the second cutting bits such that first grooves milled in a work surface by the rotor are spaced by the pitch distance, and, when the first outer shell portion and the second outer shell portion are mounted to the inner drum outer surface in a second pitch configuration, each of the first cutting bits may be longitudinally spaced from longitudinally adjacent second cutting bits by one-half of the pitch distance such that second grooves milled in the work surface by the rotor are spaced by one-half of the pitch distance.

In another aspect of the present disclosure, an adjustable pitch rotor for a milling machine is disclosed. The adjustable pitch rotor may include an inner drum having a hollow cylindrical shape and an inner drum outer surface, an outer shell, and a shell adjustment mechanism. The outer shell may include a first outer shell portion disposed on the inner drum outer surface and having a first set of drum cutting assemblies having first cutting bits extending outward from a first shell portion outer surface, wherein each of the first cutting bits is longitudinally spaced from longitudinally adjacent first cutting bits by a pitch distance, and a second outer shell portion disposed on the inner drum outer surface and having a second set of drum cutting assemblies having second cutting bits extending outward from a second shell portion outer surface, wherein each of the second cutting bits is longitudinally spaced from longitudinally adjacent second cutting bits by the pitch distance. The shell adjustment mechanism may engage the first outer shell portion and the second outer shell portion and may be operable to move the first outer shell portion and the second outer shell portion longitudinally relative to each other. When the shell adjustment mechanism moves the first outer shell portion and the second outer shell portion to a first pitch configuration, each of the first cutting bits may be longitudinally aligned with a corresponding one of the second cutting bits such that first grooves milled in a work surface by the adjustable pitch rotor are spaced by the pitch distance, and, when the shell adjustment mechanism moves the first outer shell portion and the second outer shell portion to a second pitch configuration, each of the first cutting bits may be longitudinally spaced from longitudinally adjacent second cutting bits by one-half of the pitch distance such that second grooves milled in the work surface by the adjustable pitch rotor are spaced by one-half of the pitch distance.

In a further aspect of the present disclosure, an adjustable pitch rotor for a milling machine is disclosed. The adjustable pitch rotor may have a longitudinal axis and may include an inner drum having a hollow cylindrical shape and an inner drum outer surface, a first drum flange having an annular shape and extending radially outward from the inner drum outer surface at a first drum end, a second drum flange having the annular shape and extending radially outward from the inner drum outer surface at a second drum end, and an outer shell. The outer shell may include a first outer shell portion disposed on the inner drum outer surface and having a first set of drum cutting assemblies having first cutting bits extending outward from a first shell portion outer surface, wherein each of the first cutting bits is longitudinally spaced from longitudinally adjacent first cutting bits by a pitch distance, and a second outer shell portion disposed on the inner drum outer surface and having a second set of drum cutting assemblies having second cutting bits extending outward from a second shell portion outer surface, wherein each of the second cutting bits is longitudinally spaced from longitudinally adjacent second cutting bits by the pitch distance. The adjustable pitch rotor may further include a first end ring mounted on the first drum flange and extending axially inward past the first drum flange and overlaying first outer edges of the first outer shell portion and the second outer shell portion, and a second end ring mounted on the second drum flange and extending axially inward past the first drum flange and overlaying second outer edges of the first outer shell portion and the second outer shell portion. The first drum flange and the second drum flange may extend radially outward from the inner drum outer surface by a flange radial length that is at least equal to an outer shell radial thickness so that the first drum flange and the second drum flange engage lateral edges of the first outer shell portion and the second outer shell portion to limit longitudinal movement of the first outer shell portion and the second outer shell portion along the inner drum outer surface. When the first outer shell portion and the second outer shell portion are mounted to the inner drum outer surface in a first pitch configuration, each of the first cutting bits may be longitudinally aligned with a corresponding one of the second cutting bits such that first grooves milled in a work surface by the adjustable pitch rotor are spaced by the pitch distance, and, when the first outer shell portion and the second outer shell portion are mounted to the inner drum outer surface in a second pitch configuration, each of the first cutting bits may be longitudinally spaced from longitudinally adjacent second cutting bits by one-half of the pitch distance such that second grooves milled in the work surface by the adjustable pitch rotor are spaced by one-half of the pitch distance.

Additional aspects are defined by the claims of this patent.

DETAILED DESCRIPTION

Figure 1:
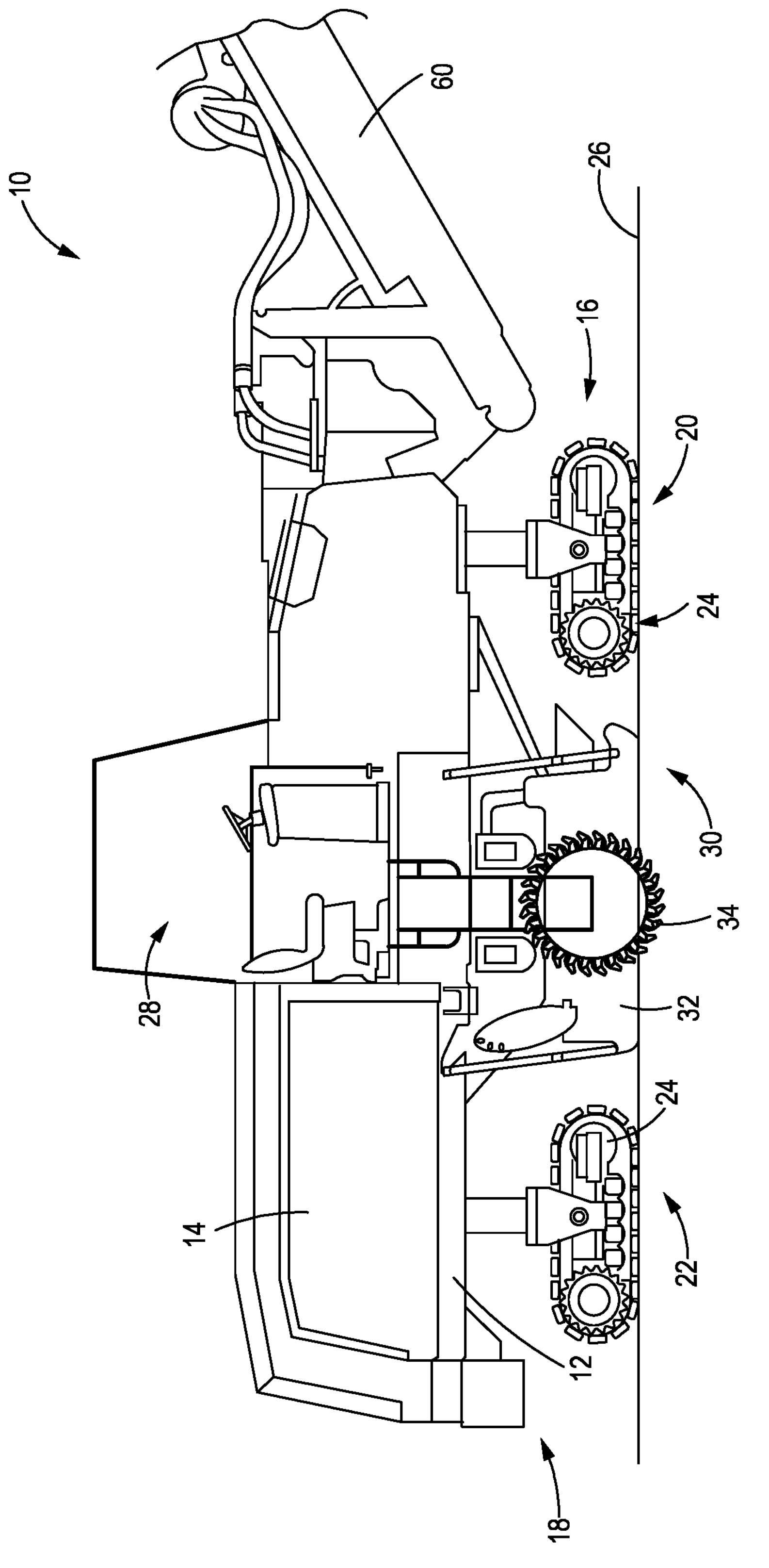
FIG. 1 is a side view of an exemplary milling machine in which an adjustable pitch rotor in accordance with the present disclosure may be implemented.

FIG. 1 is a side view of an exemplary machine 10 according to one embodiment of the present disclosure. The machine 10 is embodied as a cold planer. Alternatively, the machine 10 may embody another machine that removes materials from a ground surface or roadbed, such as a rotary mixer or any milling machine of the type known in the art. The machine 10 may include a frame 12 and an engine enclosure 14 that is attached to the frame 12 and houses an engine (not shown). The engine is generally an internal combustion engine, but may be an electric motor, hybrid engine or other alternative power source, and provides propulsion power to the machine 10 and also powers various components of the machine 10.

The machine 10 may have a front end 16 and a rear end 18. The front end 16 of the machine 10 may have a front drive assembly 20 and the rear end 18 may have a rear drive assembly 22. Each of the front drive assembly 20 and the rear drive assembly 22 may include a pair of tracks 24. The tracks 24 may be driven by a hydraulic system of the machine 10. Alternatively, the machine 10 may include wheels or other ground engaging technology (not shown) for propelling the machine 10 over a work surface 26. The machine 10 may also include an operator platform 28 with machine control devices for controlling the operation of the machine 10. When the machine 10 is embodied as a manual or semi-autonomous machine, an operator of the machine 10 may sit or stand at the operator platform 28 to operate the machine 10.

The machine 10 may further include a rotor chamber 30 positioned between the front drive assembly 20 and the rear drive assembly 22. The rotor chamber 30 may provide an enclosed space defined by a first side plate 32 and a second side plate (not shown) disposed on a right side and a left side of the machine 10, respectively. A rotor 34 rotatably coupled to the frame 12 lies within the rotor chamber 30. The rotor 34 is positioned between the first side plate 32 and the second side plate. In one example, the rotor 34 is embodied as a height adjustable rotor.

Figure 2:
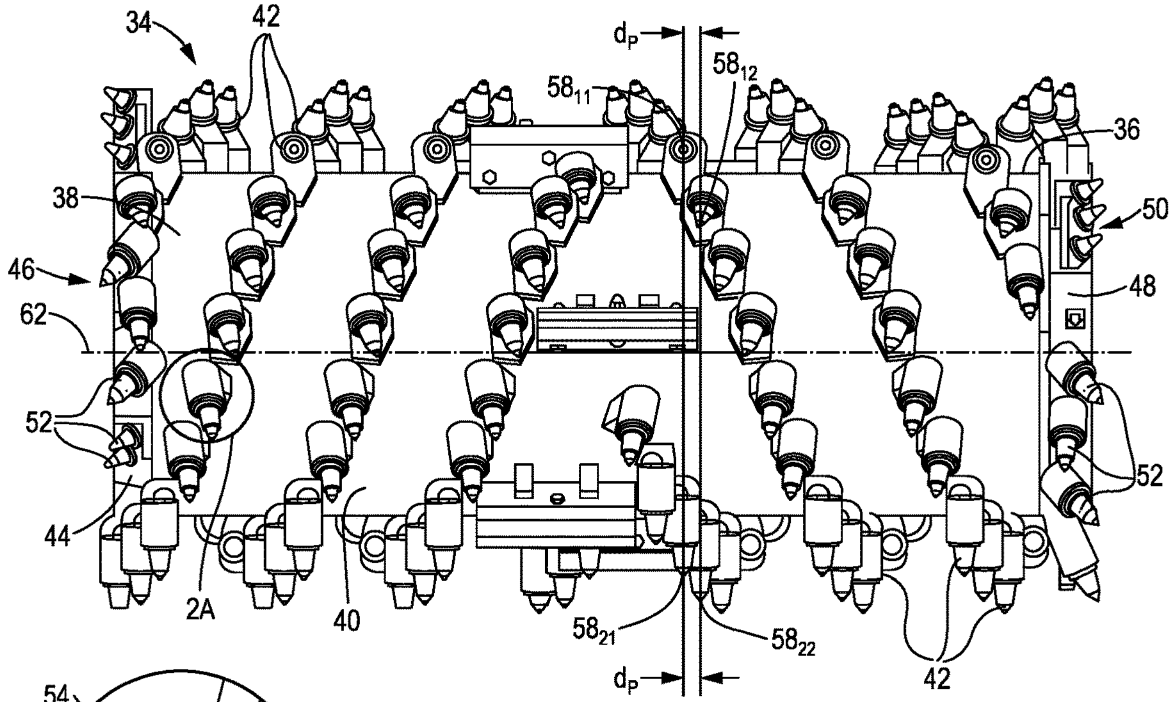
FIG. 2 is a front view of an adjustable pitch rotor in accordance with the present disclosure in a first pitch configuration.
Figure 2A:
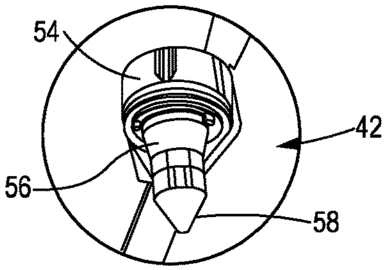
FIG. 2A is an enlarged view of an exemplary cutting assembly of the adjustable pitch rotor of FIG. 2.

As shown in FIG. 2, the adjustable pitch rotor 34 in accordance with the present disclosure includes a generally cylindrical outer shell 36 that is divided into a first outer shell portion 38 and a second outer shell portion 40 to facilitate adjustment of the pitch of the rotor 34 as discussed further below. A plurality of drum cutting assemblies 42 extend outward from outer surfaces of the outer shell portions 38, 40. Further, the rotor 34 includes a first end ring 44 at a first end 46 of the outer shell 36 and a second end ring 48 at a second end 50 of the outer shell 36 that include a plurality of ring cutting assemblies 52 extending outward from radially outer edges of the end rings 44, 48. Each cutting assembly 42 may include a tool block 54 attached to the outer surface of the corresponding outer shell portions 38, 40, respectively, a tool holder 56, and a cutting bit 58. The cutting assemblies 52 may have similar configurations with the tool blocks 54 attached to the corresponding end rings 44, 48. With this arrangement, the cutting bits 58 may be removed and replaced as necessary without replacing the entire cutting assembly 42, 52. The cutting bits 58 of the cutting assemblies 42, 52 contact the work surface 26 for removal of material therefrom. When the machine 10 is moved into position over the work surface 26, the rotor 34 can be lowered so that the rotor 34 contacts and cuts the work surface 26 through force applied by the cutting bits 58 of the cutting assemblies 42, 52 on the work surface 26.

In the illustrated embodiment, the cutting assemblies 42 are spirally arranged on the outer shell 36. More particularly, the cutting assemblies 42 on the left side of the rotor 34 as shown are arranged in a clockwise spiral starting from the first end 46 of the rotor 34, whereas the cutting assemblies 42 on the right side of the rotor 34 are arranged in a counter-clockwise spiral starting from the second end 50 of the rotor 34. This arrangement of the cutting assemblies 42 allows movement of removed material to a central portion of the rotor 34 from where the removed material can be moved by a conveyor 60 (FIG. 1) to another machine (not shown), such as a truck.

The cutting assemblies 42 will be arranged on the outer shell 36 to cut the work surface 26 and produce a milled surface that meets a prescribed texture requirement. The texture requirement corresponding to the configuration of the rotor 34 may be expressed as a pitch, which is a center-to-center distance between longitudinally adjacent cutting bits 58 and between grooves milled into the work surface 26, and a number of cutting bits 58 that cut into the work surface 26 to form each groove during each 360° rotation of the rotor 34. Consequently, a rotor configuration having a pitch of 30 mm and two cutting bits 58 longitudinally aligned to cut each groove may be expressed as a 30×2 configuration. A rotor configuration having a pitch of 15 mm and one cutting bit 58 cutting each groove may be expressed as a 15×1 configuration. Other rotor configurations with varying pitches and aligned cutting bits 58 are used, but previously-known rotors are limited to a single configuration.

Figure 3:
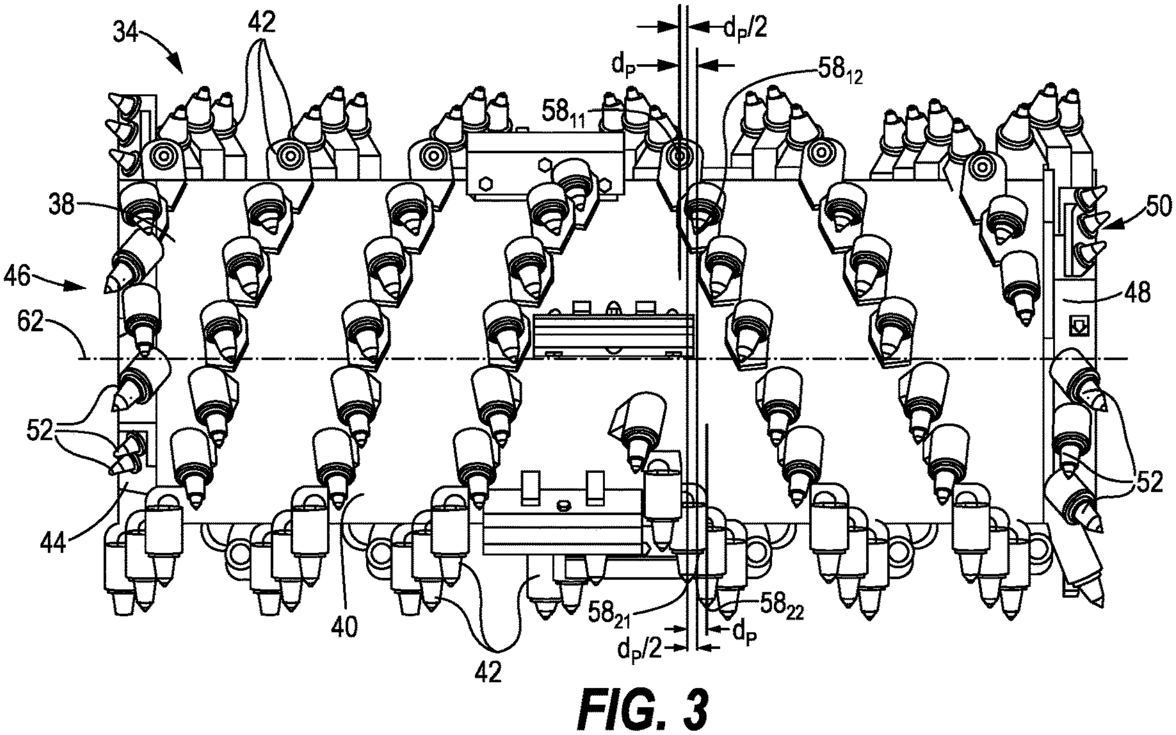
FIG. 3 is a front view of the adjustable pitch rotor of FIG. 2 in a second pitch configuration.

The rotor 34 in accordance with the present disclosure is capable of being adjusted to two or more pitch configurations without removing the rotor 34 from the machine 10, thereby reducing the frequency of replacing the rotor 34 with a different rotor configured specifically for a particular finished road texture. FIGS. 2 and 3 illustrate two distinct pitch configurations for the rotor 34 that are achievable by moving the outer shell portions 38, 40 of the outer shell 36 relative to each other parallel to a longitudinal axis 62 of the rotor 34. Referring to FIG. 2, the cutting bits 58 on the first outer shell portion 38 are longitudinally spaced from each longitudinally adjacent cutting bit 58 on the first outer shell portion 38 by a pitch distance $d_P$. Consequently, a first cutting bit $\mathbf{58}_{11}$ of the first outer shell portion 38 is spaced from a second cutting bit $\mathbf{58}_{12}$ by the pitch distance $d_P$. Similarly, a first cutting bit $\mathbf{58}_{21}$ of the second outer shell portion 40 is spaced from a second cutting bit $\mathbf{58}_{22}$ by the pitch distance $d_P$. In the positions shown in FIG. 2 in which the rotor 34 is in a first pitch configuration, the outer shell portions 38, 40 are positioned along the longitudinal axis 62 so that each of the cutting bits 58 of the first outer shell portion 38 is aligned with a corresponding one of the cutting bits 58 of the second outer shell portion 40. As indicated by the vertical lines that are perpendicular to the longitudinal axis 62, the first cutting bits $\mathbf{58}_{11}$, $\mathbf{58}_{21}$ are longitudinally aligned so that the cutting bits $\mathbf{58}_{11}$, $\mathbf{58}_{21}$ will cut the same groove in the work surface 26. Similarly, the second cutting bits $\mathbf{58}_{12}$, $\mathbf{58}_{22}$ are longitudinally aligned to cut a groove that is spaced from the groove cut by the first cutting bits $\mathbf{58}_{11}$, $\mathbf{58}_{21}$ by the pitch distance $d_P$. The remaining cutting bits 58 on the outer shell portions 38, 40 are similarly aligned so that the rotor 34 has a $d_P$×2 configuration with the outer shell portions 38, 40 in the first pitch configuration of FIG. 2.

In FIG. 3, the outer shell portions 38, 40 have been moved along the longitudinal axis 62 relative to each other to a second pitch configuration. The outer shell portions 38, 40 have been moved longitudinally by one-half of the pitch distance $d_P$ so that each of the cutting bits 58 on the first outer shell portion 38 are longitudinally spaced from the longitudinally adjacent cutting bits 58 on the second outer shell portion 40 by one-half of the pitch distance $d_P$. In the illustrated embodiment of FIG. 3, the first outer shell portion 38 has been moved to the left by one-quarter of the pitch distance $d_P$ relative to the end rings 44, 48 and the position shown in FIG. 2. At the same time, the second outer shell portion 40 has been moved to the right by one-quarter of the pitch distance $d_P$ to produce the one-half of the pitch distance $d_P$ longitudinal spacing. In other embodiments, one of the outer shell portions 38, 40 may be moved by one-half of the pitch distance $d_P$ while the other outer shell portion 38, 40 remains stationary relative to the longitudinal axis 62. After the outer shell portions 38,40 are repositioned relative to each other, the first cutting bit $\mathbf{58}_{21}$ of the second outer shell portion 40 is longitudinally aligned half way between the longitudinally adjacent cutting bits $\mathbf{58}_{11}$, $\mathbf{58}_{12}$ of the first outer shell portion 38, or at one-half of the pitch distance $d_P$ from each. The second cutting bit $\mathbf{58}_{22}$ is one-half of the pitch distance $d_P$ to the right of the second cutting bit $\mathbf{58}_{12}$. The other cutting bits 58 are similarly longitudinally spaced so that the rotor 34 has a $d_P$/2×1 configuration in the second pitch configuration to form grooves in the work surface 26 that are spaced at one-half of the pitch distance $d_P$ and are cut by only one of the cutting bits 58.

While the rotor 34 as illustrated is adjustable to have two pitch configurations, those skilled in the art will appreciate that adjustable pitch rotors 34 having more than two pitch configurations may be implemented. For example, the outer shell 36 may be divided into three or more outer shell portions. With three outer shell portions, a rotor 34 may have three pitch configurations: 1) a $d_P$×3 configuration with grooves spaced by the pitch distance $d_P$ each cut by three cutting bits 58; 2) a $d_P$/3×1 configuration with grooves spaced by one-third of the pitch distance $d_P$ each cut by one cutting bit 58; and 3) a $d_P$/2×½ configuration with grooves spaced by one-half of the pitch distance $d_P$ and alternating between being cut by one or two cutting bits 58. Further alternative implementations of the adjustable pitch rotor 34 with varying numbers of outer shell portions and pitch configurations are contemplated by the inventor.

As a further alternative, instead of being split into the outer shell portions 38, 40 by a plane parallel to the longitudinal axis 62, the outer shell 36 may be divided into two half outer shell portions by a 45° plane that runs 360° around the rotor 34. In such an implementation, pitch adjustment may be performed by spinning the first outer shell portion relative to the second outer shell portion. Due to the split plane at the 45° angle, the spinning of the outer shell portions 38, 40 relative to each other would cause longitudinal movement that would change the longitudinal spacing of the cutting bits 58 in a similar manner as discussed above for the illustrated embodiment to create first and second pitch configurations.

Figure 4:
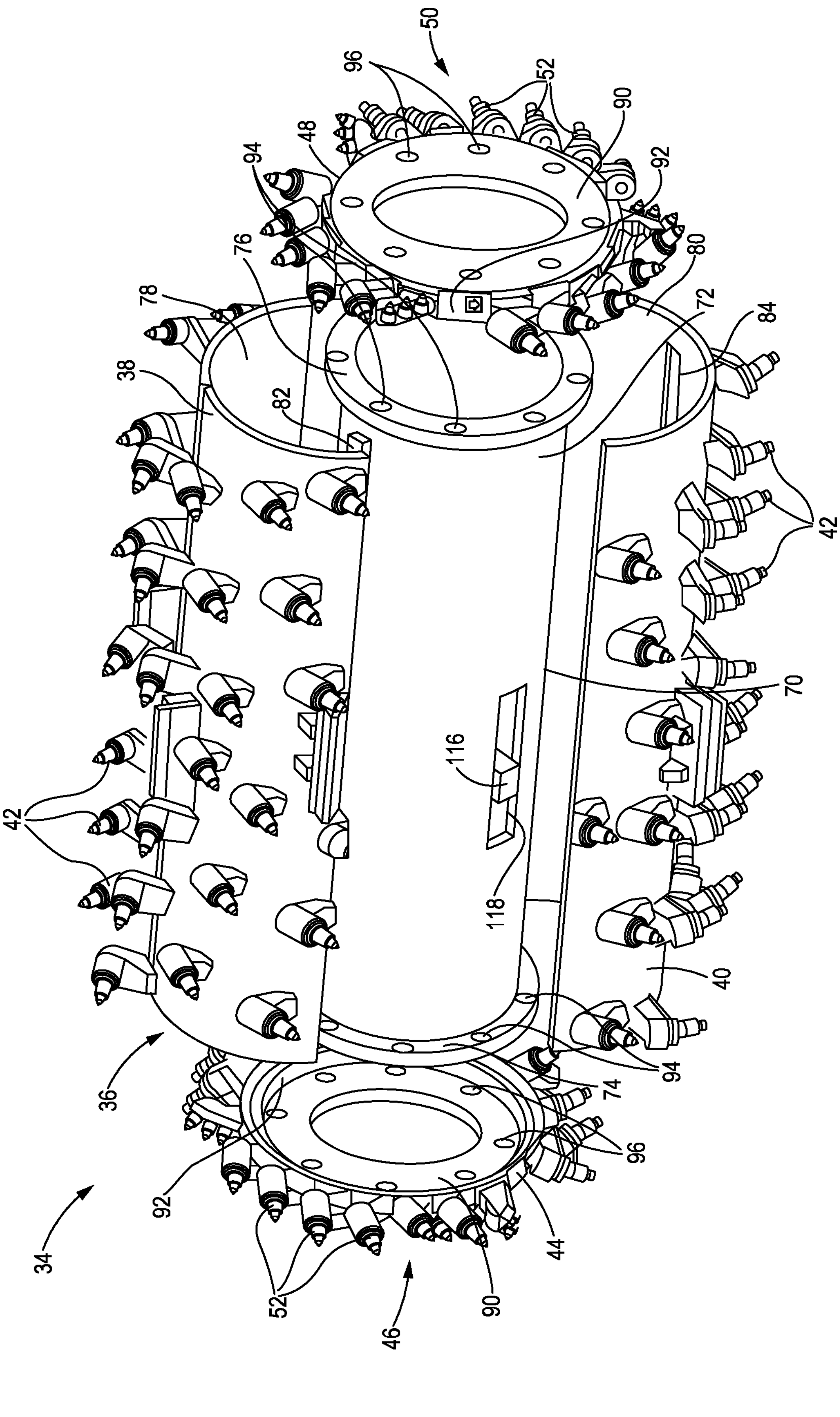
FIG. 4 is an exploded view of an embodiment of the adjustable pitch rotor of FIG. 2.

FIG. 4 illustrates an exploded view of an embodiment of the adjustable pitch rotor 34. The rotor 34 as shown includes an inner drum 70 having a hollow cylindrical shape and an inner drum outer surface 72. The inner drum 70 further includes a first drum flange 74 having an annular shape and extending radially outward from the inner drum outer surface 72 at the first end 46 of the rotor 34. Similarly, a second drum flange 76 extends radially outward from the inner drum outer surface 72 at the second end 50 of the rotor 34.

The inner drum outer surface 72 has a complimentary shape to a first shell inner surface 78 and a second shell inner surface 80 of the outer shell portions 38, 40, respectively. As shown, the surfaces 72, 78, 80 may be cylindrical with an outer diameter of the inner drum outer surface 72 being slightly smaller than an inner diameter of the shell inner surface 78, 80 to minimize any radial gaps and relative radial movement between the surfaces 72, 78, 80. In alternative embodiments, the surfaces 72, 78, 80 may have complimentary non-cylindrical shapes, such as ovoid or elliptical shapes, to produce engagement between the surfaces 72, 78, 80 that will prevent circumferential rotation of the outer shell portions 38, 40 relative to the inner drum 70 when the rotor 34 is operated to cut the work surface 26.

Figure 5:
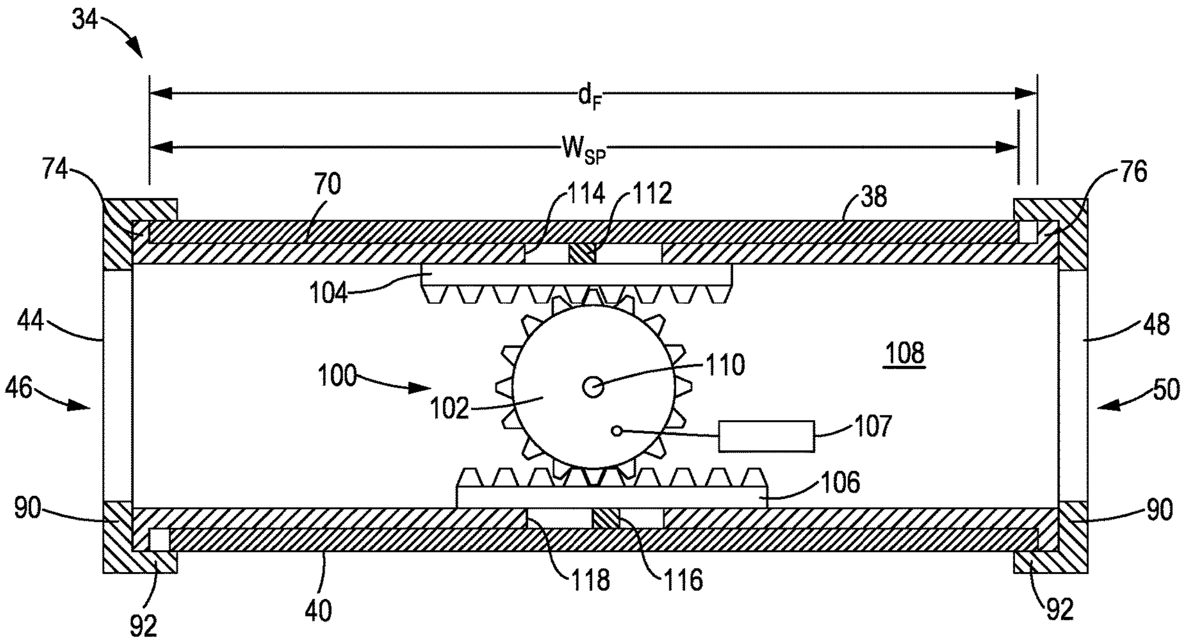
FIG. 5 is a schematic cross-sectional view of an embodiment of the adjustable pitch rotor of FIG. 2 with the cutting assemblies omitted for clarity of illustration.

To facilitate adjustment of the outer shell portions 38, 40 as discussed above, the drum flanges 74, 76 are longitudinally spaced apart by a flange distance $d_F$ that is greater than a shell portion longitudinal width $w_{SP}$ of the outer shell portions 38, 40 as shown in the schematic cross-sectional view of FIG. 5 where the cutting assemblies 42, 52 are omitted for clarity of illustration. The minimum difference between the flange distance $d_F$ and the shell portion width $w_{SP}$ is a distance necessary to move the outer shell portions 38, 40 between the first and second pitch configurations. If the outer shell portions 38, 40 move in opposite directions as illustrated and described with respect to FIGS. 2 and 3, each outer shell portion 38, 40 moves one-quarter of the pitch distance $d_P$ to adjust between the pitch configurations, and the flange distance $d_F$ would be equal to at least $w_{SP}+d_P/4$. In other embodiments where one of the outer shell portions 38, 40 remains stationary relative to the inner drum 70 and the other outer shell portion 38, 40 moves one-half of the pitch distance $d_P$ to reconfigure the rotor 34 between the pitch configurations, the flange distance $d_F$ would be equal to at least $w_{SP}+d_P/2$.

Returning to FIG. 4, in the illustrated cylindrical configuration of the surfaces 72, 78, 80, the outer shell portions 38, 40 and the inner drum 70 may have complimentary features to prevent circumferential rotation of the outer shell 36 about the inner drum 70 while also guiding the longitudinal movement of the outer shell portions 38, 40. In the illustrated embodiment, alignment members such as alignment rails 82 may extend radially outward from the inner drum outer surface 72 on opposite sides of the inner drum 70 (only one rail 82 visible from FIG. 4 viewing angle). Corresponding alignment recesses 84 may be formed in the shell inner surfaces 78, 80 of the outer shell portions 38, 40 (only recess 84 in second shell inner surface 80 visible from FIG. 4 viewing angle). The alignment rails 82 and the alignment recesses 84 may have complimentary shapes so that each alignment recess 84 can receive the corresponding alignment rail 82 therein when the outer shell portions 38, 40 are assembled onto the inner drum 70. The alignment rails 82 and the alignment recesses 84 are configured with circumferential dimensions such that the alignment rails 82 engage the alignment recesses 84 to substantially prevent circumferential rotation of the outer shell portions 38, 40 relative to the inner drum 70. At the same time, the alignment rails 82 have longitudinal lengths that are less than longitudinal lengths of the alignment recesses 84 to allow the alignment rails 82 to slide longitudinally within the longitudinal recesses 84 and the outer shell portions 38, 40 to move longitudinally between the pitch configurations. Those skilled in the art will understand that the alignment rails 82 and alignment recesses 84 are exemplary of structures that may be implemented between the outer shell portions 38, 40 and the inner drum 70 to prevent circumferential rotation of the outer shell portions 38, 40 while allowing longitudinal movement of the outer shell portions 38, 40 between the pitch configurations. In other embodiments, structures such as the alignment rails 82 and the alignment recesses 84 may be angled relative to the longitudinal axis 62 such that the outer shell portions 38, 40 move through a combination of circumferential rotation and longitudinal translation between the pitch configurations. Implementation of such alternative structures in adjustable pitch rotors 34 in accordance with the present disclosure is contemplated by the inventor.

The end rings 44, 48 and the drum flanges 74, 76 may be configured to assist in retaining the outer shell portions 38, 40 around the inner drum 70 while allowing adjustment between the pitch configurations. Each of the end rings 44, 48 may include a ring end wall 90 having an annular shape, and a ring cylinder guard 92 having an annular shape and extending longitudinally inward from the ring end wall 90. As shown in FIG. 5, the drum flanges 74, 76 may have a flange outer diameter such that the drum flanges 74, 76 extend radially outward from the inner drum outer surface 72 by a radial length that is at least equal to an outer shell radial thickness so that a flange outer edge is at least flush with the outer surfaces of the outer shell portions 38, 40, or may extend beyond. The ring cylinder guards 92 may have an inner diameter that is greater than the flange outer diameter so that the end rings 44, 48 may slide over the drum flanges 74, 76 with inward surfaces of the ring end walls 90 abutting the outward surfaces of the drum flanges 74, 76. In the illustrated embodiment, the drum flanges 74, 76 include bolt holes 94 therethrough and the ring end walls 90 include corresponding bolt holes 96 through which bolts or other fasteners (not shown) may be inserted to secure the end rings 44, 48 to the drum flanges 74, 76. Bolting the end rings 44, 48 to the drum flanges 74, 76 may facilitate removal of the end rings 44, 48 if necessary to adjust the outer shell portions 38, 40 between the pitch configurations.

In some implementations, the rotor 34 may be outfitted with multiple sets of end rings 44, 48, with each set of end rings 44, 48 having the ring cutting assemblies 52 positioned to correspond to one of the pitch configurations of the rotor 34 so that the pitch of the grooves formed by the ring cutting assemblies 52 at either end of the rotor 34 matches the pitch of the grooves formed by the drum cutting assemblies 42 in the particular pitch configuration. If necessary, the end rings 44, 48 may be split into multiple segments to reduce weight and allow for one or more end ring segments to be swapped while the remaining end ring segments remain secured to the drum flanges 74, 76 to engage and retain the outer shell portions 38, 40. Alternative attachment mechanisms for either temporary or permanent attachment of the end rings 44, 48 to the drum flanges 74, 76 to meet requirements for a particular implementation of the adjustable pitch rotor 34 are contemplated.

FIG. 5 further illustrates the ring cylinder guards 92 being configured to retain the outer shell portions 38, 40. The ring cylinder guards 92 extend longitudinally inward past the drum flanges 74, 76 to positions that overlay outer edges of the outer shell portions 38, 40. The ring cylinder guards 92 may extend past the drum flanges 74, 76 by a distance that is sufficient to cover the largest gap between the outer edges of the outer shell portions 38, 40 and the corresponding drum flanges 74, 76 as the outer shell portions 38, 40 move between the pitch configurations. With this arrangement, the ring cylinder guards 92 may cover and engage the outer edges of the outer shell portions 38, 40 to prevent the outer shell portions 38, 40 from being pulled away from the inner drum 70. At the same time, the ring cylinder guards 92 may prevent debris from entering the gaps between the outer edges of the outer shell portions 38, 40 and the drum flanges 74, 76 and thereby prevent restrictions on movement of the outer shell portions 38, 40. Gaskets or other sealing mechanisms (not shown) may be installed on the inner surfaces of the ring cylinder guards 92 to further shield the gaps from debris.

In some implementations, the outer shell portions 38, 40 may be moved manually between the pitch configurations. In one embodiment, the rotor 34 may include a locking mechanism (not shown) that may be locked to hold the outer shell portions 38, 40 in one of the pitch configurations, unlocked or released to allow the outer shell portions 38, 40 to move to the another pitch configurations, and then relocked to secure the outer shell portions 38, 40 in the new pitch configuration. The locking mechanism may be any appropriate apparatus that is capable of being engaged and disengaged to alternately lock and unlock the outer shell portions 38, 40.

In alternative embodiments, the rotor 34 may include a shell adjustment mechanism that is operable to move the outer shell portions 38, 40 between the pitch configurations. One embodiment of a shell adjustment mechanism 100 is illustrated in FIGS. 4 and 5. Referring to FIG. 5, the shell adjustment mechanism 100 may be in the form of a rack-and-pinion drive mechanism disposed within the inner drum 70. The shell adjustment mechanism 100 may be installed within the inner drum 70 along with other internal components of the rotor 34. The shell adjustment mechanism 100 may include a pinion gear 102, a first rack 104 associated with the first outer shell portion 38, and a second rack 106 associated with the second outer shell portion 40. The pinion gear 102 may be rotatably mounted to an inner drum inner surface 108 via a shaft 110. The racks 104, 106 may be slidably mounted to the inner drum inner surface 108 by brackets or other mounting structures (not shown) that may allow the racks 104, 106 to be driven longitudinally when the pinion gear 102 is rotated. The first rack 104 may be operatively connected to the first outer shell portion 38 by a first connection member 112 extending through a first slot 114 through the wall of the inner drum 70. Similarly, the second rack 106 may be operatively connected to the second outer shell portion 40 by a second connection member 116 extending through a second slot 118 through the wall of the inner drum 70.

With this arrangement, the racks 104, 106 will slide longitudinally when the pinion gear 102 rotates in either direction to slide the outer shell portions 38, 40 between the pitch configurations. In some embodiments, the pinion gear 102 may be rotated manually via a wrench or appropriate linkage that may be accessible through one of the ends 46, 50 of the rotor 34. In other embodiments, the shell adjustment mechanism 100 may include an automated drive mechanism 107 such as a pneumatic cylinder, a hydraulic cylinder, a solenoid or the like that is operatively connected to the pinion gear 102 and may be actuated to drive the pinion gear 102 in either direction. Base ends of the drive mechanisms 107 may be rigidly connected to the inner drum inner surface 108 to drive the shell adjustment mechanism 100, and gearbox coolant may be stored in a reservoir within the inner drum 70. The shell adjustment mechanism 100 may further include a locking mechanism that may be engaged to secure the rotor 34 in either of the pitch configurations.

The shell adjustment mechanism 100 is exemplary of shell adjustment mechanisms that may be implemented in the rotor 34 to move the outer shell portions 38, 40. Alternative shell adjustment mechanisms that may be installed within the inner drum 70 are contemplated by the inventor. Additionally, shell adjustment mechanisms may be implemented that are installed between the outer shell 36 and the inner drum 70. The configurations of the outer shell 36 and the inner drum 70 may be adjusted to provide a gap between the inner drum outer surface 72 and the shell portion inner surfaces 78, 80. In other implementations, adjustment mechanism recesses may be formed in the inner drum outer surface 72 to receive the shell adjustment mechanism while maintaining a close fit between the shell portions 38, 40 and the inner drum 70. In these implementations, the shell adjustment mechanism may be disposed proximate the intersection of the shell portions 38, 40 to engage both shell portions 38, 40 to move between the pitch configurations when the shell adjustment mechanism is actuated.

INDUSTRIAL APPLICABILITY

The adjustable pitch rotor 34 in accordance with the present disclosure eliminates at least part of the requirement to have multiple cutting rotors to create different finished road textures by providing a single rotor 34 that can be switched between multiple available pitch configurations. In one embodiment illustrated herein, the single rotor 34 can be switched from a $d_P \times 2$ configuration to a $d_P/2 \times 1$ configuration, and back to the $d_P \times 2$ configuration. The switching action can be performed with the adjustable pitch rotor 34 installed on the machine 10. Adjustment of the rotor 34 between the pitch configurations can be performed manually via a shell adjustment mechanism such as the rack-and-pinion adjustment mechanism 100 illustrated and described herein, or automated using hydraulic cylinders, power actuators or other powered devices. Use of the adjustable pitch rotor 34 in milling applications can reduce the inventory of rotors and capital requirements of the machine owner through the versatility of the adjustable pitch rotors 34, while also reducing the time and labor that would be required to swap rotors for each different finished road texture that may be required across multiple jobs and departments of transportation for which the milling machine 10 may be used.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A rotor for a milling machine, the rotor having a longitudinal axis, the rotor comprising:

an inner drum having a hollow cylindrical shape and an inner drum outer surface; and an outer shell comprising:

a first outer shell portion with a first set of drum cutting assemblies having first cutting bits extending outward from a first shell portion outer surface, wherein each of the first cutting bits is longitudinally spaced from longitudinally adjacent first cutting bits by a pitch distance, and a second outer shell portion with a second set of drum cutting assemblies having second cutting bits extending outward from a second shell portion outer surface, wherein each of the second cutting bits is longitudinally spaced from longitudinally adjacent second cutting bits by the pitch distance, wherein, when the first outer shell portion and the second outer shell portion are mounted to the inner drum outer surface in a first pitch configuration, each of the first cutting bits is longitudinally aligned with a corresponding one of the second cutting bits such that first grooves milled in a work surface by the rotor are spaced by the pitch distance, and wherein, when the first outer shell portion and the second outer shell portion are mounted to the inner drum outer surface in a second pitch configuration, each of the first cutting bits is longitudinally spaced from longitudinally adjacent second cutting bits by one-half of the pitch distance such that second grooves milled in the work surface by the rotor are spaced by one-half of the pitch distance; and wherein the first outer shell portion moves parallel to the longitudinal axis of the rotor relative to the second outer shell portion between the first pitch configuration and the second pitch configuration.

2. The rotor of claim 1, wherein the inner drum comprises a first alignment member and a second alignment member extending radially outward from the inner drum outer surface, wherein the first outer shell portion has a first alignment recess defined in a first shell inner surface of the first outer shell portion and receiving the first alignment member, wherein the second outer shell portion has a second alignment recess defined in a second shell inner surface of the second outer shell portion and receiving the second alignment member, and wherein the first alignment member and the second alignment member engage the first alignment recess and the second alignment recess, respectively, to prevent circumferential rotation of the first outer shell portion and the second outer shell portion relative to the inner drum.

3. The rotor of claim 2, wherein the first outer shell portion and the second outer shell portion move between the first pitch configuration and the second pitch configuration by sliding the first alignment recess and the second alignment recess longitudinally along the first alignment member and the second alignment member, respectively.

4. The rotor of claim 1, wherein the inner drum comprises:

a first drum flange having an annular shape and extending radially outward from the inner drum outer surface at a first drum end; and a second drum flange having the annular shape and extending radially outward from the inner drum outer surface at a second drum end, wherein the first drum flange and the second drum flange engage lateral edges of the first outer shell portion and the second outer shell portion to limit longitudinal movement of the first outer shell portion and the second outer shell portion along the inner drum outer surface.

5. The rotor of claim 4, wherein the first drum flange and the second drum flange extend radially outward from the inner drum outer surface by a flange radial length that is at least equal to an outer shell radial thickness.

6. The rotor of claim 4, comprising a first end ring and a second end ring, wherein each of the first end ring and the second end ring comprises:

a ring end wall having an annular shape; and a ring cylinder guard having an annular shape and extending longitudinally inward from the ring end wall, wherein the corresponding one of the first drum flange and the second drum flange is inserted through the ring cylinder guard and the ring end wall engages and is connected to the corresponding one of the first drum flange and the second drum flange to retain the corresponding one of the first end ring and the second end ring thereon.

7. The rotor of claim 6, wherein the ring cylinder guard of each of the first end ring and the second end ring extends axially inward from the ring end wall past the corresponding one of the first drum flange and the second drum flange and overlays shell portion outer edges of the first outer shell portion and the second outer shell portion when the first outer shell portion and the second outer shell portion are in the first pitch configuration and the second pitch configuration.

8. The rotor of claim 1, comprising a shell adjustment mechanism mounted to the inner drum and engaging the first outer shell portion and the second outer shell portion, wherein the shell adjustment mechanism is operable to move the first outer shell portion and the second outer shell portion between the first pitch configuration and the second pitch configuration.

9. The rotor of claim 1, wherein the first outer shell portion moves longitudinally in one direction by one-quarter of the pitch distance and the second outer shell portion moves longitudinally in an opposite direction by one-quarter of the pitch distance to adjust the rotor from the first pitch configuration to the second pitch configuration.

10. The rotor of claim 1 wherein the first outer shell portion moves longitudinally by one-half of the pitch distance to adjust the rotor from the first pitch configuration to the second pitch configuration.

11. An adjustable pitch rotor for a milling machine, comprising:

an inner drum having a hollow cylindrical shape and an inner drum outer surface;

an outer shell comprising:

a first outer shell portion disposed on the inner drum outer surface and having a first set of drum cutting assemblies having first cutting bits extending outward from a first shell portion outer surface, wherein each of the first cutting bits is longitudinally spaced from longitudinally adjacent first cutting bits by a pitch distance, and a second outer shell portion disposed on the inner drum outer surface and having a second set of drum cutting assemblies having second cutting bits extending outward from a second shell portion outer surface, wherein each of the second cutting bits is longitudinally spaced from longitudinally adjacent second cutting bits by the pitch distance; and a shell adjustment mechanism engaging the first outer shell portion and the second outer shell portion, wherein the shell adjustment mechanism is operable to move the first outer shell portion and the second outer shell portion longitudinally relative to each other, wherein, when the shell adjustment mechanism moves the first outer shell portion and the second outer shell portion to a first pitch configuration, each of the first cutting bits is longitudinally aligned with a corresponding one of the second cutting bits such that first grooves milled in a work surface by the adjustable pitch rotor are spaced by the pitch distance, and wherein, when the shell adjustment mechanism moves the first outer shell portion and the second outer shell portion to a second pitch configuration, each of the first cutting bits is longitudinally spaced from longitudinally adjacent second cutting bits by one-half of the pitch distance such that second grooves milled in the work surface by the adjustable pitch rotor are spaced by one-half of the pitch distance.

12. The adjustable pitch rotor of claim 11, wherein the shell adjustment mechanism comprises:

a pinion gear rotatably mounted to the inner drum;

a first rack slidably mounted within the inner drum and operatively connected to the first outer shell portion; and a second rack slidably mounted within the inner drum and operatively connected to the second outer shell portion, wherein rotation of the pinion gear in one direction causes the first rack and the second rack to move the first outer shell portion and the second outer shell portion to the first pitch configuration, and wherein rotation of the pinion gear in an opposite direction causes the first rack and the second rack to move the first outer shell portion and the second outer shell portion to the second pitch configuration.

13. The adjustable pitch rotor of claim 12, wherein the pinion gear is mounted within the inner drum, the adjustable pitch rotor comprising:

a first connection member extending through a first slot through an inner drum wall and operatively connecting the first rack to the first outer shell portion; and a second connection member extending through a second slot through the inner drum wall and operatively connecting the second rack to the second outer shell portion.

14. The adjustable pitch rotor of claim 12, comprising an automated drive mechanism operatively coupled to the pinion gear and actuatable to rotate the pinion gear and move the first outer shell portion and the second outer shell portion between the first pitch configuration and the second pitch configuration.

15. An adjustable pitch rotor for a milling machine, the adjustable pitch rotor having a longitudinal axis, the adjustable pitch rotor comprising:

an inner drum having a hollow cylindrical shape and an inner drum outer surface;

a first drum flange having an annular shape and extending radially outward from the inner drum outer surface at a first drum end;

a second drum flange having the annular shape and extending radially outward from the inner drum outer surface at a second drum end;

an outer shell comprising:

a first outer shell portion disposed on the inner drum outer surface and having a first set of drum cutting assemblies having first cutting bits extending outward from a first shell portion outer surface, wherein each of the first cutting bits is longitudinally spaced from longitudinally adjacent first cutting bits by a pitch distance, and a second outer shell portion disposed on the inner drum outer surface and having a second set of drum cutting assemblies having second cutting bits extending outward from a second shell portion outer surface, wherein each of the second cutting bits is longitudinally spaced from longitudinally adjacent second cutting bits by the pitch distance;

a first end ring mounted on the first drum flange and extending axially inward past the first drum flange and overlaying first outer edges of the first outer shell portion and the second outer shell portion; and a second end ring mounted on the second drum flange and extending axially inward past the first drum flange and overlaying second outer edges of the first outer shell portion and the second outer shell portion, wherein the first drum flange and the second drum flange extend radially outward from the inner drum outer surface by a flange radial length that is at least equal to an outer shell radial thickness so that the first drum flange and the second drum flange engage lateral edges of the first outer shell portion and the second outer shell portion to limit longitudinal movement of the first outer shell portion and the second outer shell portion along the inner drum outer surface, wherein, when the first outer shell portion and the second outer shell portion are mounted to the inner drum outer surface in a first pitch configuration, each of the first cutting bits is longitudinally aligned with a corresponding one of the second cutting bits such that first grooves milled in a work surface by the adjustable pitch rotor are spaced by the pitch distance, and wherein, when the first outer shell portion and the second outer shell portion are mounted to the inner drum outer surface in a second pitch configuration, each of the first cutting bits is longitudinally spaced from longitudinally adjacent second cutting bits by one-half of the pitch distance such that second grooves milled in the work surface by the adjustable pitch rotor are spaced by one-half of the pitch distance.

16. The adjustable pitch rotor of claim 15, wherein the first outer shell portion moves longitudinally in one direction by one-quarter of the pitch distance and the second outer shell portion moves longitudinally in an opposite direction by one-quarter of the pitch distance to adjust the adjustable pitch rotor from the first pitch configuration to the second pitch configuration.

17. The adjustable pitch rotor of claim 15, wherein the first outer shell portion moves longitudinally by one-half of the pitch distance to adjust the adjustable pitch rotor from the first pitch configuration to the second pitch configuration.

18. The adjustable pitch rotor of claim 15, wherein the inner drum comprises a first alignment member and a second alignment member extending radially outward from the inner drum outer surface, wherein the first outer shell portion has a first alignment recess defined in a first shell inner surface of the first outer shell portion and receiving the first alignment member, wherein the second outer shell portion has a second alignment recess defined in a second shell inner surface of the second outer shell portion and receiving the second alignment member, and wherein the first alignment member and the second alignment member engage the first alignment recess and the second alignment recess, respectively, to prevent circumferential rotation of the first outer shell portion and the second outer shell portion relative to the inner drum.

19. The adjustable pitch rotor of claim 18, wherein the first outer shell portion and the second outer shell portion move between the first pitch configuration and the second pitch configuration by sliding the first alignment recess and the second alignment recess longitudinally along the first alignment member and the second alignment member, respectively.

20. The adjustable pitch rotor of claim 15, comprising a shell adjustment mechanism mounted to the inner drum and engaging the first outer shell portion and the second outer shell portion, wherein the shell adjustment mechanism is operable to move the first outer shell portion and the second outer shell portion between the first pitch configuration and the second pitch configuration.

* * * * *